United States Patent [19]

Masuda et al.

[11] Patent Number: 4,784,016
[45] Date of Patent: Nov. 15, 1988

[54] DIFFERENTIAL DEVICE USING A VISCOUS FLUID COUPLING MECHANISMS

[75] Inventors: Katsuhiko Masuda; Seiichi Hirai; Tetsuro Hamada, all of Wako, Japan

[73] Assignee: Honda Giken Kogyo Kabushiki Kaisha, Tokyo, Japan

[21] Appl. No.: 4,723

[22] Filed: Jan. 20, 1987

[30] Foreign Application Priority Data

Jan. 20, 1986 [JP] Japan .................. 61-8137
Jan. 27, 1986 [JP] Japan .................. 61-13780
Jan. 27, 1986 [JP] Japan .................. 61-8891[U]

[51] Int. Cl.⁴ ............................. F16H 35/04
[52] U.S. Cl. ............................. 74/650; 192/82 T
[58] Field of Search ............... 74/650, 711; 192/82 T

[56] References Cited

U.S. PATENT DOCUMENTS

| | | | |
|---|---|---|---|
| 3,396,605 | 8/1968 | Wilkinson et al. | 74/650 |
| 3,686,976 | 8/1972 | Philippi | 74/711 |
| 4,031,780 | 6/1977 | Dolan et al. | 74/711 |
| 4,048,872 | 9/1977 | Webb | 74/711 |
| 4,096,712 | 6/1978 | Webb | 74/711 |
| 4,650,028 | 3/1987 | Eastman et al. | 74/650 X |
| 4,662,499 | 5/1987 | Jordan | 192/82 T |

FOREIGN PATENT DOCUMENTS

| | | |
|---|---|---|
| 0068309 | 1/1983 | European Pat. Off. . |
| 2302457 | 9/1926 | France . |
| 544570 | 2/1977 | U.S.S.R. .................. 74/711 |
| 414662 | 8/1934 | United Kingdom . |
| 1412583 | 11/1975 | United Kingdom . |

Primary Examiner—Leslie A. Braun
Assistant Examiner—Dwight G. Diehl
Attorney, Agent, or Firm—Armstrong, Nikaido, Marmelstein & Kubovcik

[57] ABSTRACT

A differential device using a fluid includes a differential case and a pair of sleeves which are rotatably supported by the differential case. Each of the outer end portions of the sleeves is connectable to one of a pair of rotary output shafts, while the inner end portions of the same are protruded into the case to face each other with a small clearance left therebetween. A chamber to be filled with a viscous liquid is defined between the case and the sleeves. A plurality of drive plates which are rotatable integrally with the case and a plurality of driven plates which are rotatable integrally with the sleeves are disposed in the chamber alternately with each other and in an overlapping manner. Guide rings are interposed between the nearby driven plates to position them at equally spaced locations. One of the guide rings is constantly located in a position where the inner end faces of the sleeves face each other, whereby the driven plates are prevented from falling into the clearance between the inner end faces of the sleeves.

5 Claims, 2 Drawing Sheets

DIFFERENTIAL DEVICE USING A VISCOUS FLUID COUPLING MECHANISMS

BACKGROUND OF THE INVENTION

The present invention relates to a differential device adapted to transmit power through a fluid and, more particularly, to a differential device of the type using a viscous fluid coupling mechanism.

A differential device installed in a power transmission system of a motor vehicle and others has traditionally been implemented with planetary gears. A recent achievement in the realm of differential devices is a device which uses a viscous fluid coupling mechanism, as disclosed in European Laid-Open Patent Publication No. 68309. This type of differential device is attracting increasing attention due to its desirable performance.

A differential device using a fluid as mentioned above includes a differential case which is driven by a power unit, and a pair of rotary output shafts which are individually coupled to the differential case by viscous fluid coupling mechanisms. Specifically, in a power transmission chamber defined in the differential case, a plurality of drive plates which are rotatable integrally with the case and a plurality of driven plates which are rotatable integrally with their associated output shafts are arranged alternately overlapping each other. A viscous fluid such as silicone oil is confined in the case. In this construction, as the differential case is rotated, the drive plates in the power transmission chamber are rotated while, at the same time, the fluid transmits the rotation of the drive plates to the driven plates due to its viscosity, thereby rotating the output shafts. The difference in rotation speed between the output shafts is accommodated by the slippage of the fluid.

Generally, in a differential device of the type described, a pair of coaxial output shafts have inner end portions which are positioned within the differential case in a face-to-face relationship. Driven plates are directly mounted on the end portion of each of the output shafts which are disposed in the power transmission chamber. A problem with this configuration is that the differential device has to be assembled together with the output shafts. Specifically, because the drive plates and the driven plates are arranged alternately with each other, the respective plates have to be mounted in the case after the case has been mounted on the output shafts; it is impossible for the differential device to be constructed as a unit.

A prerequisite with this type of differential device is that a small clearance be defined between inner end faces of the output shafts to allow the output shafts to rotate independently of each other. On the other hand, the drive plates and the driven plates are usually splined to the case and the output shafts, respectively, so that they may be assembled sequentially so as to be rotatable integrally with the latter. Those plates, therefore, are capable of sliding in the axial direction. This sometimes causes the driven plates to get into the clearance between the output shafts to thereby lock the output shafts to each other, preventing them from performing smooth differential movements.

Generally, guide rings are interposed between the nearby drive or driven plates in order to space the plates by substantially constant distances from each other. Therefore, a possible implementation against the axial movement of the driven plates as stated above is positioning the driven plates in the axial direction by means of the guide rings. However, because scattering is unavoidable in the thickness of the plates and that of the guide rings and because the position of the clearance between the output shafts is effected by errors inherent in assemblage and others, it is impossible to prevent the driven plates from being located between the output shafts by simply restricting the axial movement of the driven plates.

Another problem is that the output shafts which face each other cannot be supported at their inner ends and, therefore, are unavoidably cantilevered within the case. In such a support structure, the inner end portions of the output shafts are apt to oscillate, failing to rotate themselves and transmit torque smoothly.

With regard to the fluid, it is filled in the power transmission chamber through an opening, which is formed through the case, after the assemblage of the differential device. The power transmission characteristic of the differential device is greatly effected by the ratio of the amount of fluid packed in the chamber to the volume of the chamber, i.e. packing ratio. It is necessary, therefore, that the packing ratio be adjusted delicately to an optimum one. Such delicate adjustment is very difficult, however, partly because the fluid usually comprises silicone oil whose viscosity is significantly high and partly because a number of plates are densely packed in the power transmission chamber. Moreover, because the opening adapted to pack the fluid has to be sealed, it is not easy for one to finely adjust the packing ratio of the fluid while observing the operating conditions of the differential device.

SUMMARY OF THE INVENTION

It is therefore an object of the present invention to provide a differential device using a fluid in a unitary construction.

It is another object of the present invention to prevent driven plates from falling into a clearance between rotary shafts and, thereby, to ensure smooth differential movements.

It is another object of the present invention to allow a pair of rotary shafts, on which driven plates are mounted, to be supported at both ends thereof.

It is another object of the present invention to allow the packing ratio of a viscous fluid in a power transmission chamber to be adjusted delicately after the chamber has been filled with the fluid and sealed.

In accordance with the present invention, a differential device using a fluid includes a differential case which is driven by a power unit in a rotational motion, and a pair of sleeves mounted on the case to be rotatable about the same axis of rotation as the case. Outer ends of the sleeves are rotatably mounted by the case and individually connectable to rotary output shafts. Inner end portions of the sleeves which protrude into the case are located to face each other at a small spacing at their end faces. Driven plates are mounted on each of the sleeves and spaced from each other by substantially constant amounts by guide rings, which are mounted on the outer peripheries of the sleeves. One of the guide rings is constantly located in a position where the inner end faces of the sleeves face each other. Such a construction allows the differential device to be assembled independently of the output shafts and then connected to the output shafts. In addition, that guide ring which is positioned between the end faces of the sleeves prevents the driven plates from falling into the clearance between the end faces.

In a preferred embodiment of the present invention, a small diameter extension protrudes from the inner end face of one of the sleeves, while the other sleeve is formed with a bore in which the extension is received. In this construction, each of the sleeves is supported by the case at one end and by the other sleeve at the other end and, therefore, free from undesirable oscillation.

In another preferred embodiment of the present invention, an adjustment chamber is provided which is in fluid communication with a power transmission chamber. The volume of the adjustment chamber is adjustable from the outside of the power transmission chamber. When a viscous fluid is filled in the power transmission chamber, it is also filled in the adjustment chamber. As an opening adapted to pack the fluid is sealed and then the volume of the adjustment chamber is adjusted, the fluid is displaced between the power transmission chamber and the adjustment chamber to finely adjust the packing ratio in the power transmission chamber.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
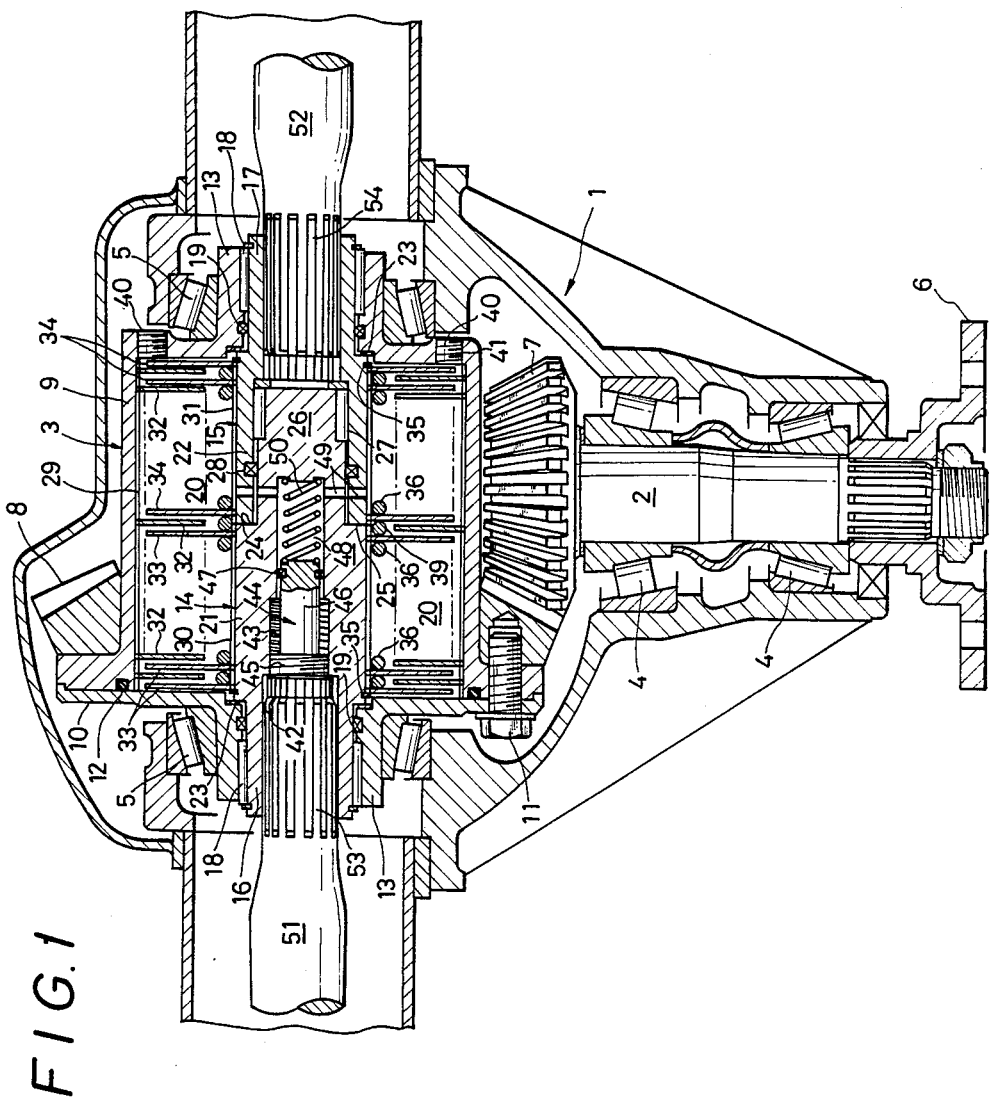
FIG. 1 is a horizontal section of a differential device embodying the present invention which is applied to a final speed reduction device of a motor vehicle.

Referring to FIG. 1 of the drawings, a pinion shaft 2 and a differential case 3 are rotatably supported by a differential carrier 1 through tapered roller bearings 4 and 4 and other tapered roller bearings 5 and 5, respectively. A flange 6 is splined to one end of the pinion shaft 2. A propeller shaft, not shown, is connected to the flange 6 and rotated by a power unit which consists of an engine, a power transmission and others, in turn rotating the pinion shaft 2.

A drive pinion 7 is rigidly mounted on the other end of the pinion shaft 2 and held in mesh with a ring gear 8, which is mounted on the case 3. Both the pinion 7 and the ring gear 8 comprise bevel gears to set up final speed reduction and are arranged such that their axes of rotation extend perpendicular to each other. In this construction, the case 3 is driven by the power unit to rotate about an axis which extends in the lateral direction of a vehicle body.

The case 3 comprises a cylindrical body 9 which is open at one end, and an end wall 10 which closes the open end of the body 9. The end wall 10 is fastened to the body 9 by bolts 11 which are adapted to fasten the ring gear 8. An O-ring 12 is interposed between the body 9 and the end wall 10 to serve a sealing function.

Provided at both ends of the case 3 are cylindrical support portions 13 and 13 which are individually supported by bearings 5 and 5. A pair of sleeves 14 and 15 extend into the case 3 while being received in center bores of the support portions 13 and 13 at their end portions 16 and 17, respectively. The sleeves 14 and 15 respectively are rotatably supported by needle bearings 18 and 18 in such a manner as to be rotatable about the same axis as the case 3. An oil seal 19 is interposed between one of the support portions 13 and the end portion 16 of the sleeve 14 and another oil seal 19 between the other support portion 13 and the end portion 17 of the sleeve 15. In this manner, the interior of the case 3 is sealed to define a fluid-tight power transmission chamber 20 which is annular in section.

Those portions of the sleeves 14 and 15 which protrude into the chamber 20, i.e., inner end portions 21 and 22 which protrude into the case 3 are greater in diameter than the outer end portions 16 and 17, respectively. Thrust washers 23 and 23 are disposed between the case 3 and the shoulders which are formed between the sleeve outer end portions 16 and 17 and the sleeve inner end portions 21 and 22. The inner end face 24 of the sleeve 14 and the inner end face 25 of the sleeve 15 face each other at a small spacing from each other. When a fluid pressure is developed in the chamber 20, forces which act on the facing ends 24 and 25 of the sleeves 14 and 15 are born by pressures which act from the washers 23 side.

An extension 26 projects from the end face 24 of the sleeve 14 and has a diameter which is smaller than that of the end face 24. The extension 26 is received in a bore (no numeral) which is formed in the inner end portion 22 of the sleeve 15. A needle bearing 27 is positioned between the outer periphery of the extension 26 and the inner periphery of the inner end portion 22 of the sleeve 15, whereby the sleeve inner end portions 21 and 22 are rotatable relative to each other. That is, the sleeve inner end portions 21 and 22 are supported by and rotatable independently of each other. An oil seal 28 is provided between the sleeve inner end portions 21 and 22.

The body 9 of the case 3 is provided with splines 29 on the inner periphery thereof, while the inner end portions 21 and 22 of the sleeves 14 and 15 respectively are provided with splines 30 and 31. A number of drive plates 32 each being provided with recesses at its outer circumference are fitted on the splines 29 of the case 3. Two groups of driven plates 33 and 34 each being provided with recesses at its inner circumference are fitted on the splines 30 and 31 of the sleeves 14 and 15. In this configuration, the drive plates 32 are rotatable integrally with the case 3, the driven plates 33 with the sleeve 14, and the driven plates 34 with the sleeve 15. Accommodated in the power transmission chamber 20, the drive plates 32 and the driven plates 33 and 34 have flat annular configurations which are substantially equal in diameter to each other. Further, the plates 32, 33 and 34 are individually provided with suitable through openings, notches and others.

The drive plates 32 are free to slide axially along the splines 29. The drive plates 33 and 34, on the other hand, are spaced by substantially equal distances along the axis by cir-clips 35 and 35 and a number of guide rings 36, 36, . . . The cir-clips 35 and 35 respectively are retained by the sleeves 14 and 15 at the opposite ends of the power transmission chamber 20, while the guide rings 36, 36, . . . are loosely fitted on the outer periphery of the sleeves 14 and 15. The drive plates 32 are positioned between the nearby driven plates 33 and 33, 33 and 34, and 34 and 34. that is, the drive plates 32 and the driven plates 33 and 34 alternate with each other with small spacings left therebetween.

Figure 2:
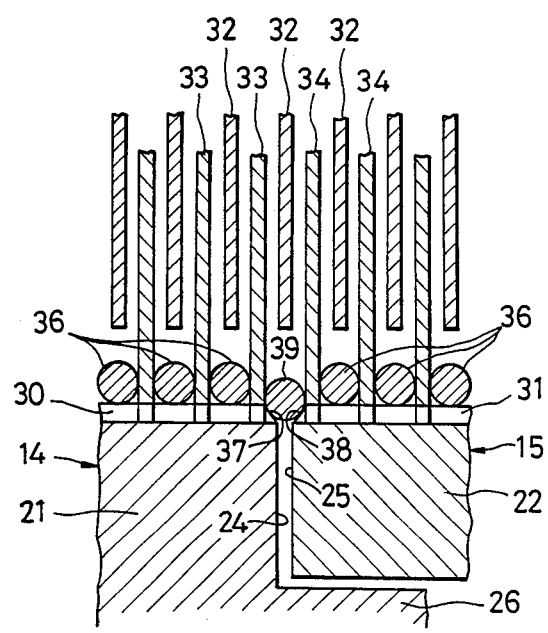
FIG. 2 is a fragmentary enlarged view of the differential device as shown in FIG. 1.

As shown in an enlarged scale in FIG. 2, the inner end faces 24 and 25 of the sleeves 14 and 15 are tapered along their peripheral edges to form tapered surfaces 37 and 38, respectively. The tapered surfaces 37 and 38 serve to define an annular recess (no numeral) therebetween. A guide ring 39 is received in the annular recess in order to maintain the innermost one of the driven plates 33 and that of the driven plates 34 spaced from each other. The guide ring 39 has an inside diameter which is smaller than the outside diameter of the sleeves 14 and 15. Hence, the guide ring 39 which is smaller in diameter than the guide rings 36 is constantly located in a position where the end faces 24 and 25 of the sleeve 14 and 15 face each other, thereby stopping the clearance between the ends 24 and 25 of the sleeves 14 and 15.

The power transmission chamber 20 is filled with silicone oil which is a highly viscous fluid. The case 3 is formed with an opening 41 for filling the chamber 20 with the fluid, the opening 41 being hermetically closed by a threaded plug 40. The inner extension 26 of the sleeve 14 is solid. A stepped center bore 42 extends through the sleeve 14 and is open at the outer end of the sleeve 14. The wall of the bore 42 is provided with a threaded portion 43 in an intermediate portion thereof. A piston 44 includes a threaded portion 45 which is mated with the threaded portion 43 of the bore 42. The piston 44 is movable along the axis when rotated. A piston portion 46 of the piston 44 is received in a reduced diameter portion of the bore 42 which is inward of the threaded portion 43. A seal member 47 is positioned between the piston portion 46 and the wall of the bore 42. The bore 42 and the piston 44 cooperate to define an adjustment chamber 48 the volume of which is adjustable. The chamber 48 is fluidly communicated to the power transmission chamber 20 by a fluid passageway 49 which extends throughout the sleeves 14 and 15. The reference numeral 50 designates a spring which is loaded between the piston 44 and the bottom wall of the bore 42 in order to prevent the interengaged threaded portions from becoming loose.

In the above construction, the volume of the adjustment chamber 48 can be adjusted to set up fluid communication between the chambers 48 and 20.

Each of the outer end portions 16 and 17 of the sleeves 14 and 15 is formed with recesses in the inner periphery thereof, while a right and a left axle shafts 52 and 51 which serve as rotary output shafts are respectively provided with splines 54 and 53 at one end thereof. The splines 53 and 54 are individually mated with the recesses of the outer ends 16 and 17 of the sleeves 14 and 15, whereby the sleeves 14 and 15 and the axle shafts 51 and 52 are interconnected to rotate integrally with each other. Although not shown in the drawing, drive wheels of the motor vehicle are individually mounted on the other end of the axle shafts 51 and 52.

The final speed reduction device constructed as described above will be operated as follows.

When the drive pinion 7 is rotated by the power unit, it in turn rotates the differential case 3 through the ring gear 8 with the result that the drive plates 32 inside of the power transmission chamber 20 are rotated about the sleeves 14 and 15. Then, the fluid in the chamber 20 is caused to rotate and flow together with the plates 32 based on frictional force and shearing force, so that the torque is transmitted to the driven plates 33 and 34. Consequently, the sleeves 14 and 15 are rotated together with the driven plates 33 and 34 while, at the same time, the rotation of the plates 33 and 34 is transmitted to the axle shafts 51 and 52 to drive the right and left wheels.

When the resistance acting on one of the wheels is smaller than the resistance acting on the other wheel such as during a turn, the sleeve 14 or 15 connected to the axle shaft 51 or 52 which is driving that particular wheel encounters smaller resistance than the other and, therefore, rotates at a higher speed than the latter. In this manner, the differential case 3, sleeves 14 and 15, drive plates 32, driven plates 33 and 34 and the fluid filled in the case 3 constitute a differential device.

In a differential device having the above construction, thrust forces act on the driven plates 33 and 34. Therefore, if there is any clearance between the plates 33 and 34 and the guide rings 36, the plates 33 and 34 are allowed to move axially together with the guide rings 36. Nevertheless, because the guide ring 39 which joins the facing inner ends 24 and 25 of the sleeves 14 and 15 is smaller in diameter than the other guide rings 36 and received in the annular recess between the tapered surfaces 37 and 38, it is prevented from being dislocated. This surely prevents the driven plate 33 or 34 from falling into the clearance between the inner ends 24 and 25 of the sleeves 14 and 15, thereby allowing the sleeves 14 and 15 to rotate independently of each other without fail. In addition, the plates 33 on the sleeve 14 and the plates 34 on the sleeve 15 are positively separated from each other, that is, the plates 33 and 34 on one sleeve are prevented from shifting themselves onto the other sleeve to change the ratio between the two groups of plates.

The sleeves 14 and 15 are individually supported at both ends thereof, i.e., supported by the case 3 at their outer end portions 16 and 17 and by each other at their inner end portions 21 and 22. This kind of support structure restrains the sleeves 14 and 15 from oscillating while they are rotated.

To assemble the differential device described above, the sleeves 14 and 15 are joined together and, then, the body 9 of the case 3 is mounted on the sleeves 14 and 15. Subsequently, the driven plates 34 and the drive plates 32 are mounted alternately on the sleeve 15 and the case body 9, respectively. In this instance, the guide rings 36 are mounted between the nearby driven plates 32, and the guide ring 39 is mounted in the facing portion of the sleeves 14 and 15. This is followed by mounting the driven plates 33 and the drive plates 32 on the sleeve 14 and the case body 9, respectively. Again, the guide rings 36 are mounted between the nearby driven plates 33. In this condition, the end wall 10 is fastened to the case body 9 together with the ring gear 8 by means of the bolts 11. Then, the fluid, i.e., silicone oil is charged into the power transmission chamber 20 through the opening 41. The fluid is admitted not only into the chamber 20 but also into the adjustment chamber 48 through the fluid passageway 49. In the meantime, air inside of the chamber 20 is expelled to the outside through another opening 41.

After a predetermined amount of fluid has been packed in the chamber 20, the opening 41 is stopped by the threaded plug 40. Then, one rotates the case 3 and, while observing the rotating conditions of the sleeves 14 and 15, rotates the threaded piston 44 by use of a tool. As the piston 44 is rotated, it moves in the axial direction to change the volume of the adjustment chamber 48. Specifically, when the volume of the chamber 48 is reduced, the fluid in the chamber 48 is forced out of the chamber 48 to flow into the chamber 20 through the passageway 49; when it is increased, the fluid in the chamber 20 is drawn into the chamber 48. In this manner, the packing ratio of the fluid in the chamber 20 is adjusted.

As regards the axle shafts 51 and 52, what is required is simply coupling them with the sleeves 14 and 15, respectively. This means that the differential device itself can be assembled independently of the vehicle body and, therefore, it can be handled in exactly the same manner as the traditional differential gears.

While the guide ring 39 has been shown and described as being positioned by the tapered surfaces 37 and 38 of the facing ends 24 and 25 of the sleeves 14 and 15, it may be positioned by a cir-clip or like alternative implementation.

In the embodiment shown and described the axle shafts 51 and 52 are splined to the inner peripheries of the outer end portions 16 and 17 of the sleeves 14 and 15, respectively. Alternatively, the sleeve outer end portions 16 and 17 may be extended in order to couple the axel shafts 51 and 52 thereto by means of flange joints.

If desired, the adjustment chamber 48 may be provided outside of the case 3, instead of inside of the sleeve 14.

It is to be noted that although the present invention has been shown and described in relation to a particular embodiment which is applied to a final speed reduction device of a motor vehicle, it is similarly applicable to any other kind of power transmission systems.

What is claimed is:

1. A differential device using a fluid, comprising:
   a differential case driven by a power unit in a rotational motion;
   a pair of sleeves rotatably supported by said case on an axis of rotation of said case and each being connectable at an outer end thereof to one of a pair of rotary output shafts in such a manner as to be rotatable integrally with said output shaft, inner end portions of said sleeves extending into said case to face each other at end faces thereof with a small clearance left therebetween;
   a fluid-tight chamber defined between said sleeves and said case to be filled with a viscous fluid;
   a plurality of drive plates and a plurality of driven plates disposed in said chamber alternately with each other and in an overlapping manner, said drive plates being mounted to be rotatable integrally with said case and slidable in an axial direction, said driven plates being mounted to be rotatable integrally with said sleeves and slidable in an axial direction; and
   a plurality of guide rings interposed between said nearby driven plates to maintain said driven plates spaced from each other;
   one of said guide rings being constantly located in a position where said end faces of said sleeves face each other.

2. A differential device as claimed in claim 1, wherein said end faces of said sleeves are tapered along peripheral edges thereof to form tapered surfaces which cooperate to define an annular recess therebetween, said one guide ring having an inside diameter which is smaller than an outside diameter of said sleeves and being disposed in said annular recess.

3. A differential device as claimed in claim 1, wherein said inner end portion of one of said sleeves is provided with an extension which extends from said end face and is reduced in diameter, said extension being received in a bore which is formed in said inner end portion of the other sleeve.

4. A differential device as claimed in claim 1, further comprising an adjustment chamber which is provided outside of and communicated to said chamber which is to be filled with the fluid, said adjustment chamber being adjustable in volume.

5. A differential device as claimed in claim 4, wherein said adjustment chamber is defined by a center bore which is formed in one of said sleeves and a threaded piston which is engaged in said center bore.

* * * * *